US006442946B1

(12) United States Patent
Kraft et al.

(10) Patent No.: US 6,442,946 B1
(45) Date of Patent: Sep. 3, 2002

(54) THREE DEGREES OF FREEDOM AFT MOUNTING SYSTEM FOR GAS TURBINE TRANSITION DUCT

(75) Inventors: Robert J. Kraft, Palm City; Charles Biondo, Jupiter; Brian R. Mack, Palm City; Mark A. Minnich, West Palm Beach, all of FL (US)

(73) Assignee: Power Systems Mfg., LLC, Jupiter, FL (US)

( * ) Notice: Subject to any disclaimer, the term of this patent is extended or adjusted under 35 U.S.C. 154(b) by 29 days.

(21) Appl. No.: 09/712,735

(22) Filed: Nov. 14, 2000

(51) Int. Cl.[7] .................................................. F02C 7/20

(52) U.S. Cl. ........................................... 60/796; 60/805

(58) Field of Search ........................... 60/796, 799, 805

(56) References Cited

U.S. PATENT DOCUMENTS 4,422,288 A * 12/1983 Steber ....................... 60/39.37
4,719,748 A * 1/1988 Davis et al. ............... 60/39.37
5,749,218 A * 5/1998 Cromer et al. ............. 60/39.37
5,761,898 A * 6/1998 Barnes et al. ................ 0/39.37

* cited by examiner

*Primary Examiner*—Charles G. Freay
(74) *Attorney, Agent, or Firm*—Malin, Haley & DiMaggio, P.A.

(57) ABSTRACT

A multiple directional axes structural support system for use as the aft end mount for a gas turbine transition duct to a turbine inlet is disclosed. The mounting system is configured to withstand high temperature gradients and mechanical loads associated with gas turbine environments while allowing multiple axes adjustment and interface capability between the transition duct and the turbine inlet casing. A spherical ball joint allows for rotation about multiple (three) axes to compensate for relative thermal growth, manufacturing tolerances, and assembly tolerances between mating surfaces. The ball joint is held in place by fitted spacers, bosses, and a through-bolt, that when torqued will dampen out unwanted vibrations in the multi-axis mounting system.

6 Claims, 7 Drawing Sheets

THREE DEGREES OF FREEDOM AFT MOUNTING SYSTEM FOR GAS TURBINE TRANSITION DUCT

BACKGROUND OF THE INVENTION

1. Field of the Invention

The present invention relates generally to the aft mounting system utilized by a gas turbine combustor transition piece. Specifically, the invention provides a support system for accurately mounting the transition duct to the turbine inlet section such that alignment adjustments between the transition duct and the turbine inlet can be made in multiple directions to the support system to compensate for thermal expansion and manufacturing and assembly tolerances.

2. Description of Related Art

Gas turbine ducts are traditionally utilized to direct hot gases from the combustor to the turbine inlet. Typically, for can-annular combustors, where each combustor centerline is not in direct line with the turbine inlet, this transition duct includes a period where change in flowpath geometry occurs in order to orient the hot combustion gases with the turbine inlet.

While this technique of redirecting combustor gas flow has been utilized for many years, increased demands for gas turbine output and improvement in combustor and turbine technology have allowed operating conditions to worsen, putting an even higher demand on the transition duct. These demands include higher operating temperature and pressure, which in turn induce higher mechanical, aerodynamic, and thermal loading.

Early support systems were comprised of gussets welded to the aft ends of the outer duct walls and to a base plate, which, in turn, was bolted to the turbine inlet frame. U.S. Pat. No. 3,759,038 issued to Scalzo, et al.; U.S. Pat. No. 3,750,398 issued to Adelizzi; and U.S. Pat. No. 3,609,968 issued to Mierley, Sr., et al, show examples of welded gusset support assemblies for transition ducts. A common shortfall of this design is the extremely high mechanical and thermal stresses seen in these fixed joints that can result in mechanical failure, as well as an inability to compensate for manufacturing and assembly tolerances between the combustor and turbine inlet.

Advancements from the fixed mount are pivoting mount systems as shown in U.S. Pat. No. 3,481,146 issued to Jackson, et al.; U.S. Pat. No. 2,457,619 issued to Buckland; U.S. Pat. No. 2,529,958 issued to Owner, et al.; and U.S. Pat. No. 2,511,432 issued to Feilden, discuss mounting systems for connecting flame tubes to turbine sections in which the mounting systems have limited pivoting capability tangential to a circle coaxial with the engine centerline. These linkage systems, while adequate for some thermal expansion and manufacturing and assembly tolerances, are limited to single pivot adjustments only.

A further advancement of a transition duct mounting system is disclosed in U.S. Pat. No. 4,422,288, which describes a hinge mount system for use in extreme temperature environments, where high thermal and mechanical loads exist. While this mounting system is an improvement over previous pivoting support systems, one problem of the system includes its limited range of mobility. With the '288 configuration, the bracket is allowed to pivot only about one axis (one degree of freedom), the tangential direction relative to a circle with the center axis along the duct centerline, similar to the device described in U.S. Pat. No. 3,481,146. This movement is restricted by locking the mount down prior to installation by tightening the bolt and nut that runs through its pivot axis. While this mount is an improvement over fully fixed designs, such as gussets, for thermal and mechanical loads and over prior pivot mounts due to its fixed position to eliminate vibration concerns, it does not adequately satisfy positioning requirements of the transition duct to the turbine inlet to adjust for manufacturing and assembly issues.

The present invention, as disclosed below, allows the manufacturer or end user to adjust the position of the transition duct mount in three axes or directions to insure proper fit-up of the transition duct to the turbine section. While this position will be fixed during engine operation by a fastener, adjustments can be made prior to fixing the components in place or prior to engine installation if necessary. Thermal expansion during operation is accurately compensated to reduce system stress.

BRIEF SUMMARY OF THE INVENTION

The present invention provides an aft mounting system for a transition duct and a turbine inlet that can be mounted together and adjusted in three degrees of freedom. The structural support system includes the capability of adjustment of the transition duct mating flange to the turbine inlet in three directions, as opposed to single axis adjustment that is currently available. The structural system in accordance with the present invention includes a central bracket with a central spherical ball mount that is affixed to the turbine inlet housing at one end and the transition duct at the opposite end, a dome plate that is affixed to the aft portion of the transition duct having mounting fingers, and a fastener that joins the central spherical ball mount to mounting fingers on the dome plate.

The central bracket includes a central spherical ball mount having a rigid, spherically-shaped body with a diametrical passageway configured in a predetermined double-conical shape. The passageway is conically tapered from the exact center of the sphere to the outer surface of the sphere. The conical passageway through the central spherical ball mount allows a predetermined amount of relative movement in three different directions or axial positions between the ball mount that is affixed to the turbine inlet housing and the dome plate that is affixed to the transition duct. The structural arrangement provides for three degrees of freedom between the transition duct and the turbine. The mounting dome affixed to the aft end of the transition duct includes a pair of mounting dome fingers. The spherical ball portion of the central spherical ball mount that is affixed to the turbine inlet is mounted in between washers and ring mounts, all of which are held in place by a fastener that passes through all the components and the conical ball joint passageway.

Therefore, in lieu of having a hinge joint with only a single direction or degree of freedom, the present invention provides for three different degrees of freedom, permitting relative movement and adjustment between the transition duct aft portion and the turbine inlet in three axes about the geometrical center of the central spherical ball mount portion of the bracket. The equivalence of motion would be equivalent to a Cartesian coordinate, X, Y, Z three-axis system that permits pitch, roll, and yaw about the axes center point. Therefore, using the present invention, the transition duct can be accurately affixed and attached to the turbine inlet section with greater ease, which allows for three different degrees of freedom of relative motion in the mounting structure. The size and contour of the conical passage diametrically through the ball joint relative to the diameter of the locking bolt defines the maximum distance of relative movement.

It is an object of the present invention to provide an improved mounting system for the aft end of a gas turbine combustor transition duct to the turbine inlet that provides three degrees of freedom of relative movement to compensate for manufacturing and assembly tolerances.

It is a further object of the present invention to provide an improved mounting system for the aft end of a gas turbine transition duct that is capable of withstanding extremely high operational temperature gradients and mechanical loads.

In accordance with these and other objects which will become apparent hereinafter, the instant invention will now be described with particular reference to the accompanying drawings.

DETAILED DESCRIPTION OF THE INVENTION

Figure 1:
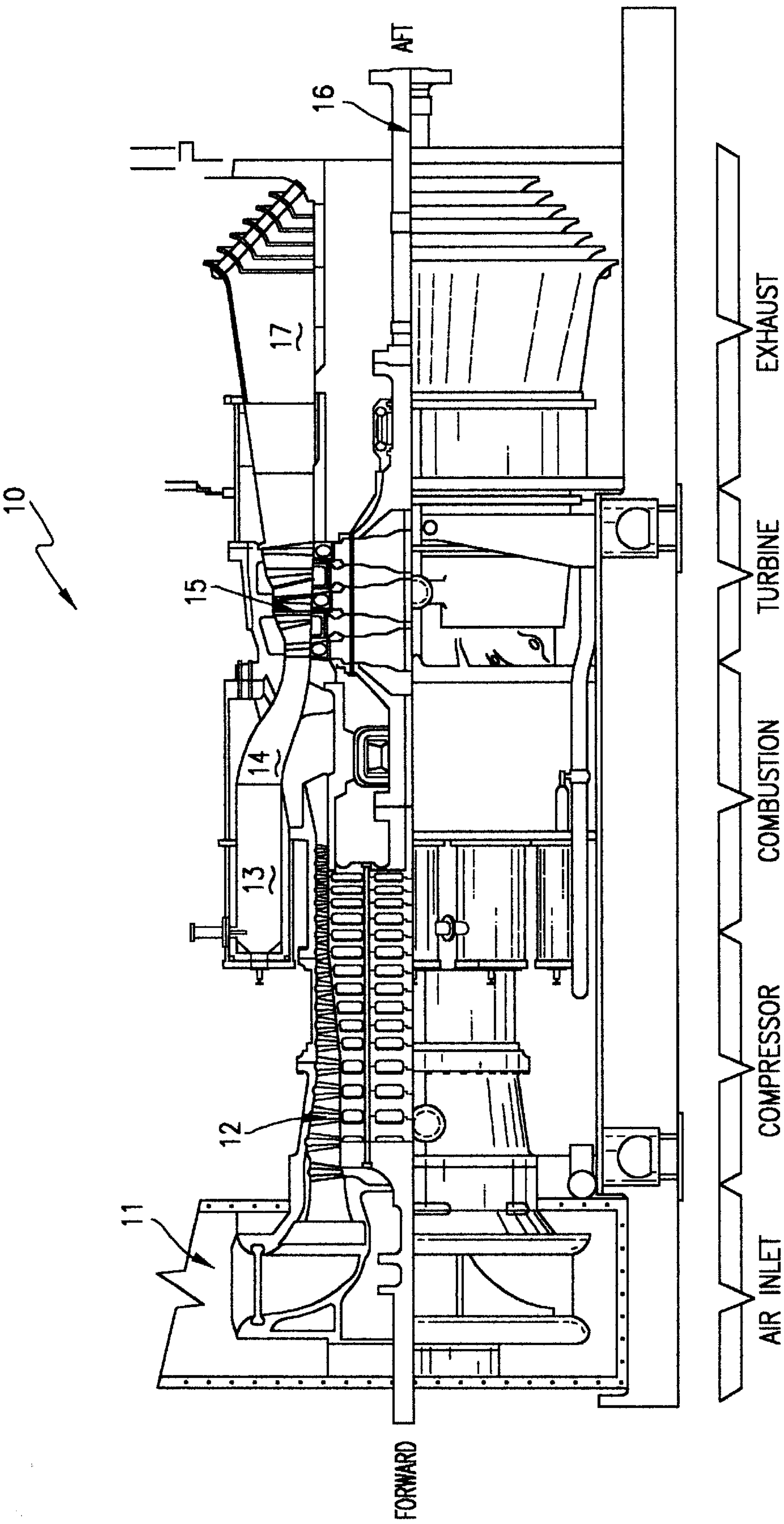
FIG. 1 shows a side elevational view of a typical gas turbine combustor in cross section.

Referring to FIG. 1, a typical prior art gas turbine engine is shown in full cross section. The engine 10 is comprised of an air inlet 11, axial compressor 12, multiple can-annular combustors 13, each with their respective transition ducts 14. The transition ducts 14 are connected to an axial turbine 15. Combustion gases exit turbine 15 into exhaust plenum 17. Gas turbines of this variety are typically used to generate electricity, which is accomplished by connecting a separate generator (not shown) to the gas turbine via shaft 16. Air enters through inlet 11 and passes through compressor 12. Compressor 12 is connected to turbine 15 via axial shaft 16. Fuel mixes and reacts with the air inside multiple combustion chambers 13. The hot gases are then transferred to the turbine 15 via transition ducts 14.

Figure 2:
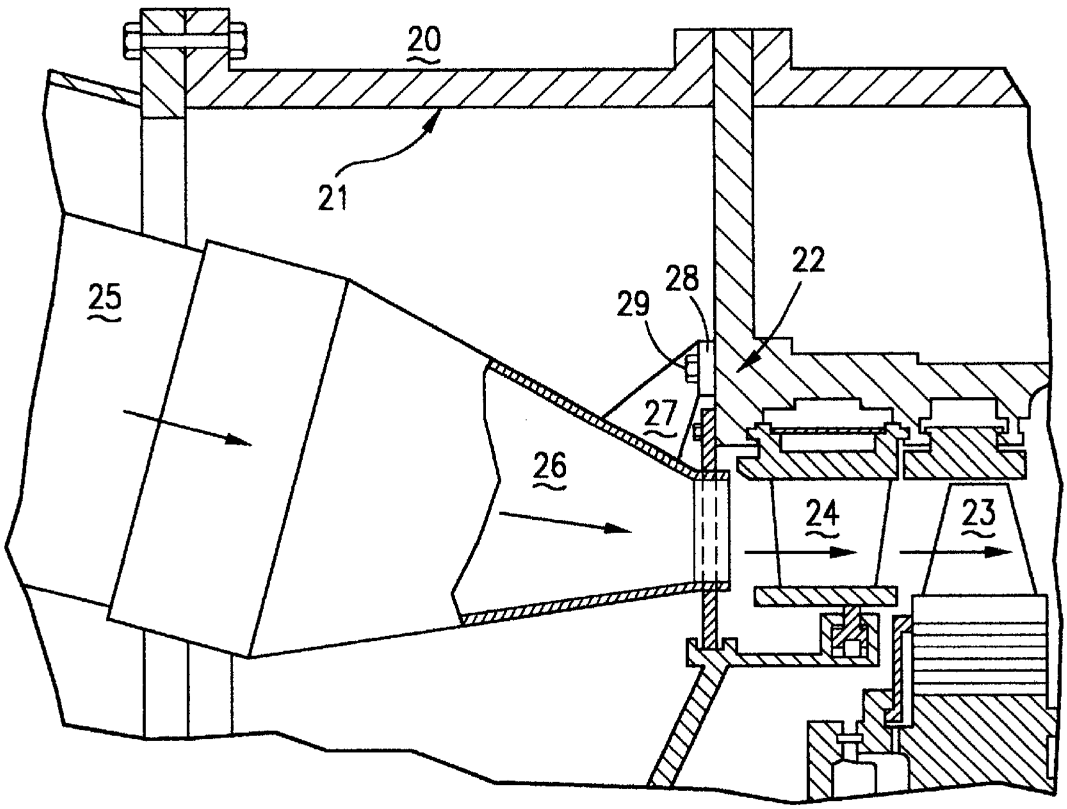
FIG. 2 PRIOR ART
FIG. 2 shows a side elevational view, partially in cross section, of an example of a prior art fixed transition/turbine inlet support structure.

FIG. 2 shows a gas turbine transition duct within an axial flow gas turbine as detailed in U.S. Pat. No. 3,750,398. This example of prior art utilizes a fully fixed mounting assembly. The gas turbine engine 20 includes an outer case 21 and inner case 22. The first stage of turbine blades and nozzles are shown as components 23 and 24, respectively. The combustor aft end 25 mates with the transition duct 26. This duct directs the hot combustion gases toward turbine nozzles 24. Rigidly mounted to transition duct 26 is a gusset 27, which extends radially outward toward inner case 22. Rigidly fixed to gusset 27 is a mounting flange 28. This flange uses a bolt 29, for fixing the gusset and hence transition duct to the turbine inner casing 22. As previously indicated, this type of rigid mounting structure has been known to result in extremely high mechanical and thermal stresses in the fixed joint. A fixed structure such as the gusset design shown in FIG. 2 does not compensate for relative radial and circumferential thermal growth, as well as dimensional tolerances between the interfaces of combustor 25, transition duct 26, and turbine inner casing 22.

Figure 3:
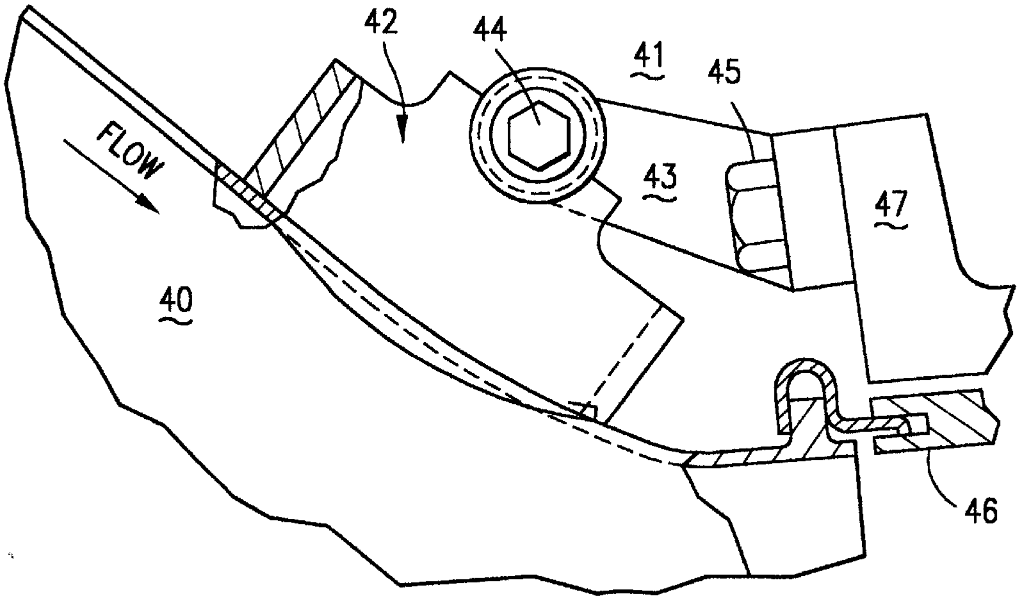
FIG. 3 PRIOR ART
FIG. 3 shows a side elevational view, partially in cross section, of an example of a prior art unidirectional pivot mounting structure.

Referring now to FIG. 3, another example of a transition duct aft mounting technique is shown. The transition duct 40 contains aft mounting system 41. This mounting system is comprised of a circular mounting ring 42, bracket 43, hinge bolt 44, and turbine case bolt 45. Transition duct 40 mates with turbine inlet 46 and is held in place using aft mounting system 41. The advantage of this system over other examples of prior art focus on the hinge mechanism that allows radial thermal growth between the transition duct 40 and turbine inlet casing 47. The bolt 44 is locked tight such that the hinge joint is not allowed to freely move under engine vibrations that could cause fatigue failure of the joint. Some motion can be absorbed by this joint, unlike previous welded support assemblies as shown in FIG. 2. Though this is an improvement, it is limited in range of motion to a single degree of freedom to absorb thermal growth as well as to adjust for manufacturing and assembly tolerances.

Figure 4:
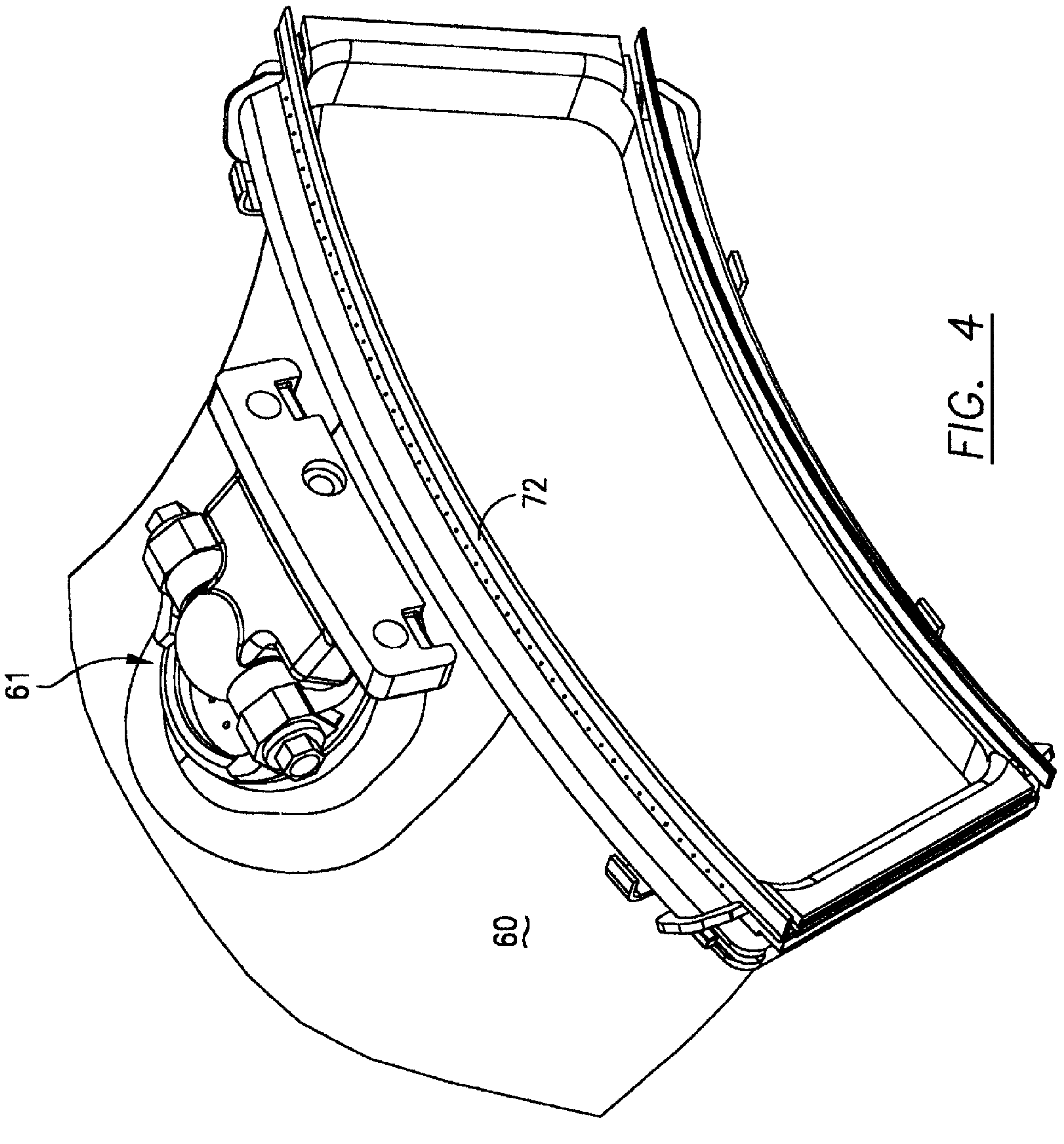
FIG. 4 shows a perspective view of the present invention installed on a transition duct (partial duct shown).

The present invention, shown in full perspective in FIG. 4, improves upon the disadvantages of the prior art by allowing compensation for thermal growth and manufacturing and assembly tolerances in all three directions of rotation. The invention is shown fully assembled at 61 and mounted to the aft end of transition duct 60 near the transition duct exit frame 72 that is mounted to the turbine inlet housing (not shown).

Figure 5:
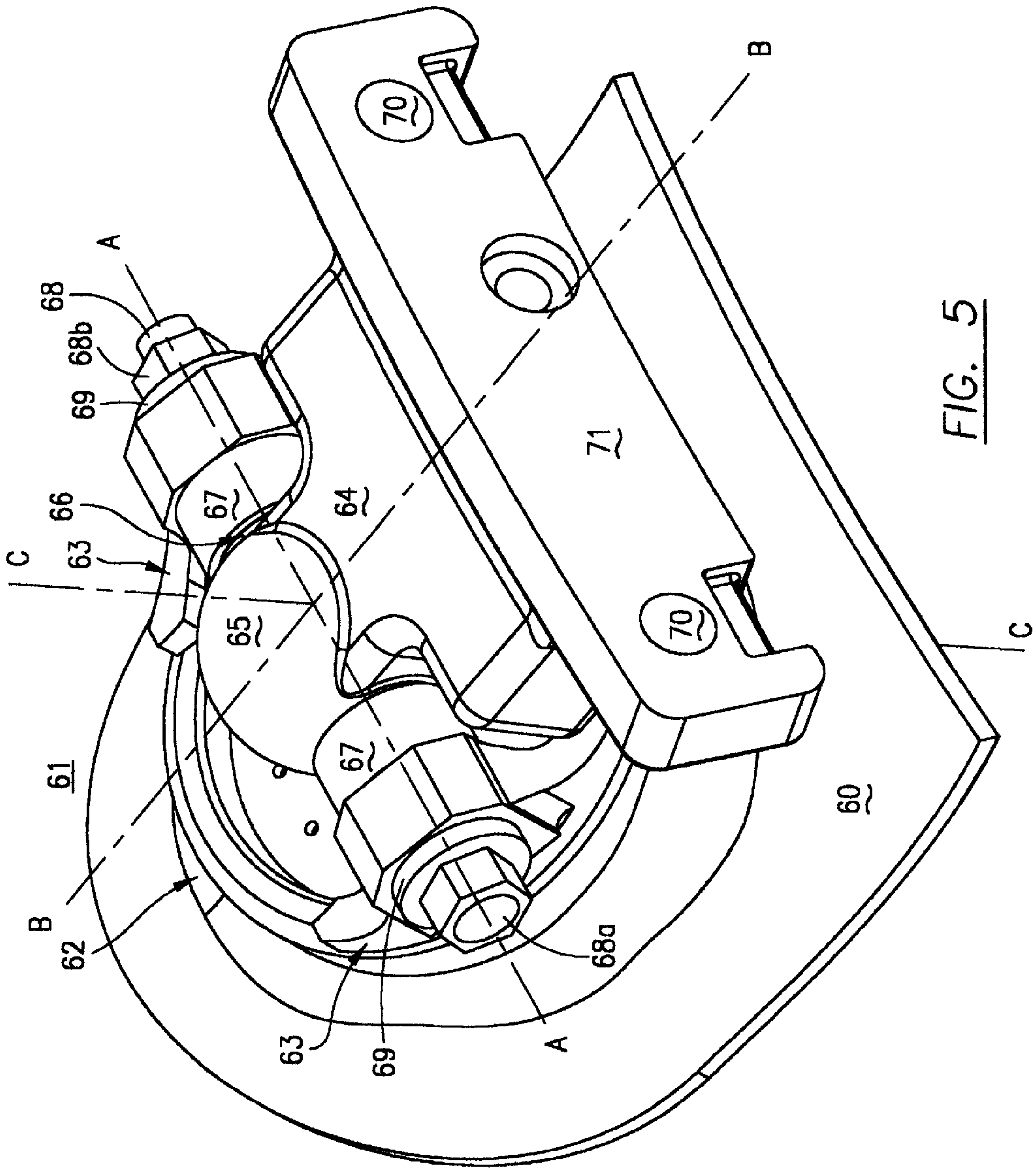
FIG. 5 shows a perspective view of the present invention.

The present invention is shown in greater detail in FIG. 5. The improved aft mounting system is welded to transition duct 60. Assembly 61 is comprised of a mounting dome 62 with two fingers 63. Each of these fingers has through holes for fixturing the multi-axis central bracket 64.

Figure 6:
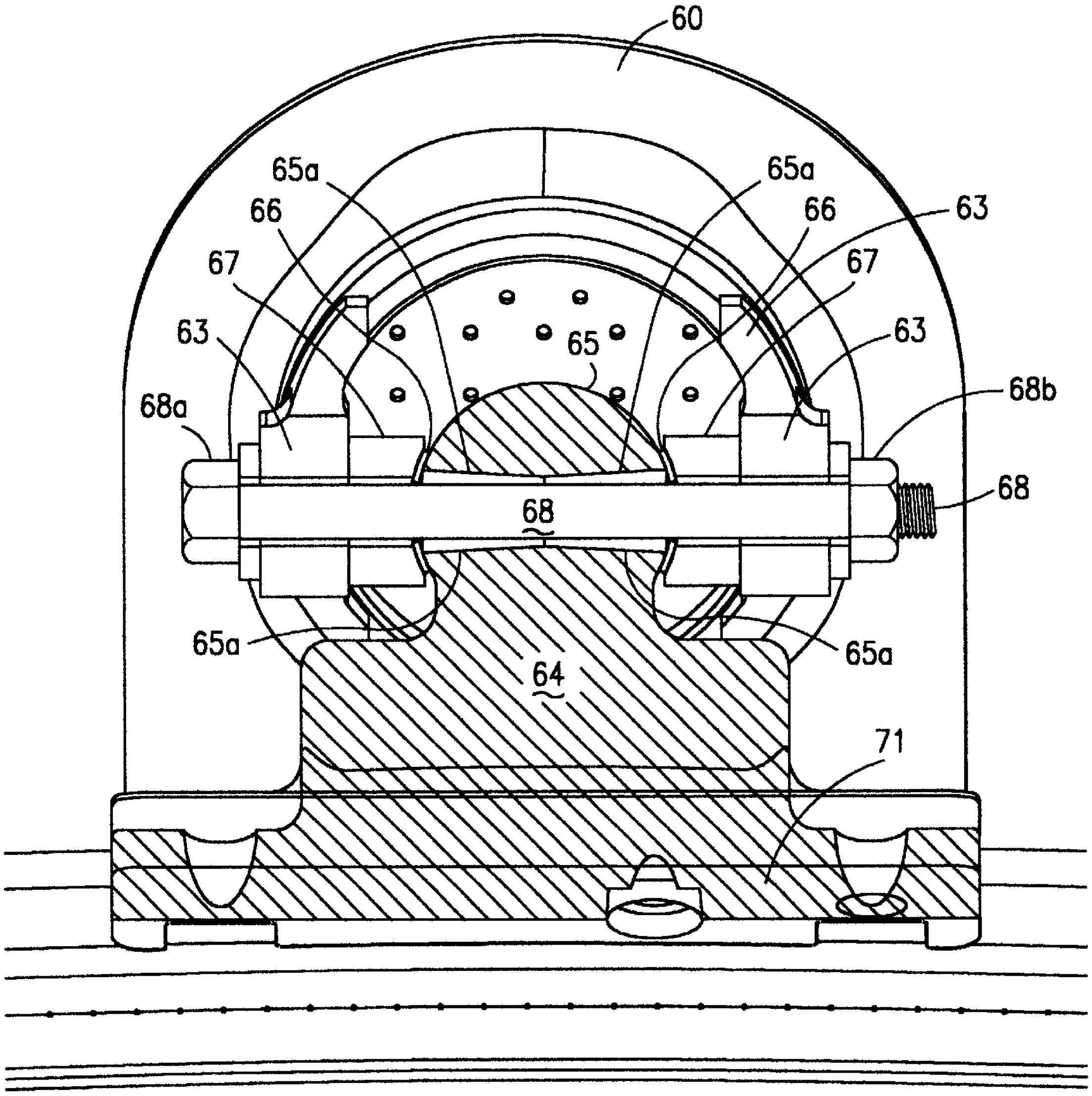
FIG. 6 shows a top plan view in cross section of the present invention.

The central bracket 64 includes a central spherical ball mount 65, which allows for multiple axis rotation relative to the dome plate. Mated to the central spherical ball mount 65 are two disposable washers 66 that are contoured to the ball mount surface. Each of these washers are located within machined ring mounts 67 that have a contour to accept the washer and, hence, the ball mount spherical surface shape. The ball joint 65, washers 66, and ring mounts 67 are all located within the mounting dome fingers 63 and held in place by a fastener 68 passing through all components. In order to insure proper fit-up and tightening of the bolt, spacer washers 69 are located between the bolt head 68a and mounting dome finger 63 and nut 68b and mounting dome finger 63. The transition duct 60 is mounted to the turbine casing 80 with bolts and nuts through two bolt holes 70 in central bracket 64. This configuration is shown in greater detail in FIG. 6.

Figure 7:
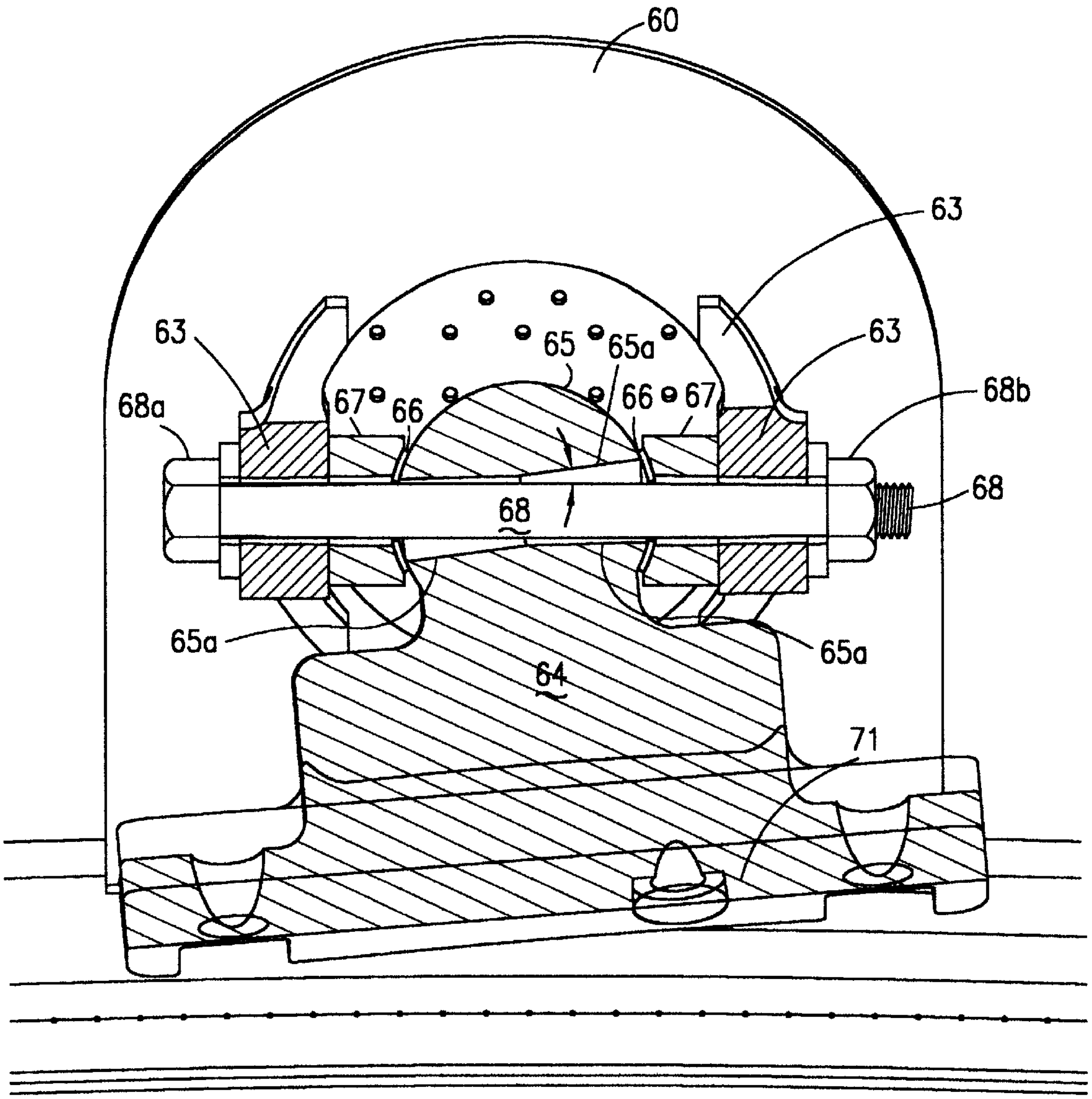
FIG. 7 shows a top plan view in cross section with the mounting bracket in a different relative position to the mounting dome than that shown in FIG. 6, demonstrating the adjustment capability of the present invention.

Referring back to FIG. 5, the three major axes of rotation are shown. The traditional axis about which prior mounting systems pivot is axis A—A. Not only does the invention disclosed herein rotate about axis A—A under thermal growth, but the transition duct 60 can rotate about axes B—B and C—C. Rotation about axes A—A, B—B, and C—C can occur due to thermal expansion of the transition duct 60 relative to the turbine casing during operation and movement of critical mating surfaces. In addition, movement about multiple axes can be required during on site assembly of the transition duct 60 to the turbine case 80. Due to the excessive size of the turbine structure, tight tolerances among mating surfaces cannot always be held and, therefore, the capability for adjustment of the central bracket 64 and mating surface 71 to the turbine casing 80 is the primary advantage of this invention. This capability can be especially helpful to the field technicians during the installation of the transition ducts to the turbine case. An example of the additional movement allowed with this invention is shown in cross section in FIG. 7. For example, a conically-shaped passage 65*a*, having a conical angle equal to three degrees, through the center of the central spherical ball mount 65 can allow approximately 0.5 inches of movement at the edge of the transition duct exit frame 72 (see FIG. 4). The conical angle and size and fastener diameter can be modified, depending upon the amount of movement required for various transition ducts and gas turbines.

Figure 8:
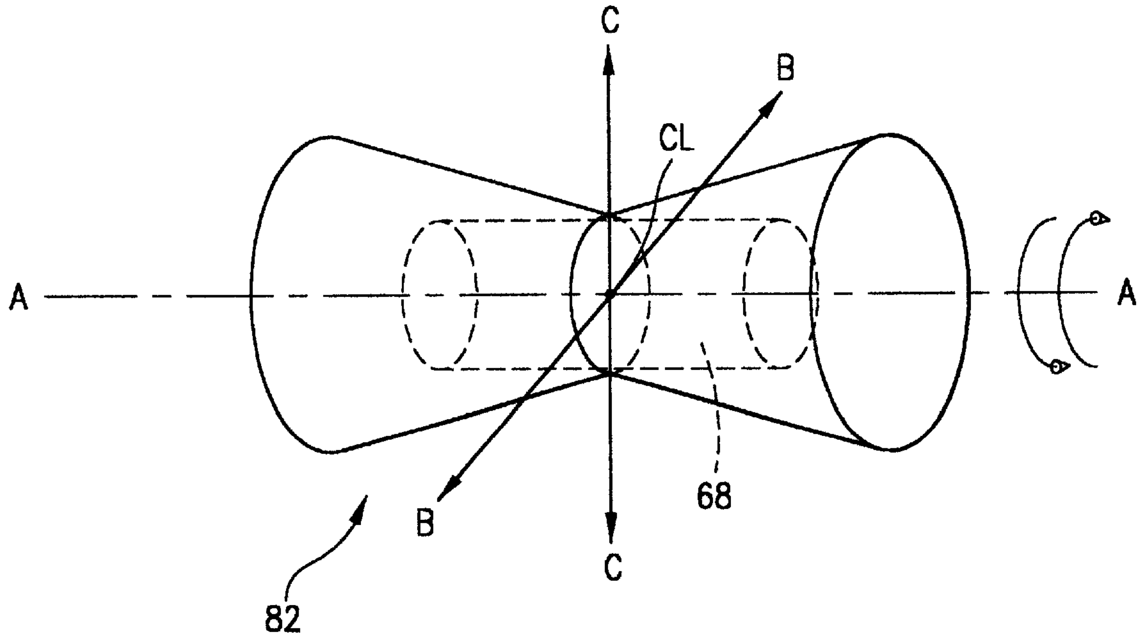
FIG. 8 shows a diagram of the conical passageway, fastener, and the three degrees of motion.

Referring now to FIG. 8, a double truncated cone 82 represents the passageway through the central spherical ball mount relative to the fastener 68. CL represents the center of the central spherical ball mount. The diameter of the fastener 68 is sized to movably contact at the very center of the conical passageway. This permits rotation around axis A, which runs through the fastener 68. Because of the conical shape of the passageway on both sides of 82, additional movement of the central spherical ball mount relative to the fastener 68 is permitted along the B axis and along the C axis, thus providing for three different degrees of freedom between the central spherical ball mount and the dome fingers. The distances and diameter of the cone and the diameter of the fastener can be varied to adjust precisely the amount of movement permitted in each direction. The fastener is further tightened against the fingers to make a very snug fit to reduce vibration concerns, while still permitting thermal expansion during operation.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A support system for attaching the aft end of a gas turbine transition duct to a turbine inlet housing to provide three degrees of freedom of relative movement between the duct and the turbine inlet comprising:

a) a base member contoured to an outer wall of the transition duct member and rigidly attachable thereto;

b) said base member further including rigidly attached fingers;

c) a support assembly including:

a central bracket having a central spherical ball mount at one end connected within said base member fingers, providing three degrees of freedom of movement between the base member and the central bracket and a mounting surface at the other end for mating the transition duct to said turbine inlet;

a pair of contoured washers sized to mate to said central spherical ball mount and constructed of such material as to absorb wear from said spherical ball mount due to vibrations;

a pair of contoured ring mounts to accept said contoured washers and spherical ball mount sized to fit between said contoured washers and said fingers;

an interconnecting fastener fitted through said fingers, contoured ring mounts, contoured washers, and central spherical ball mount for retaining said central spherical ball mount with three degrees of freedom;

said interconnecting fastener configured such that a force maybe applied to said fingers and contoured ring mounts to resist said motion of said central spherical ball mount with three degrees of freedom.

2. The support system of claim 1, wherein said interconnecting fastener includes a through-bolt and retaining nut assembly to apply a force on said support system.

3. The support system of claim 1, wherein said movement about multiple axes is accomplished by a conical-shaped through-hole having a conical angle in said central spherical ball mount, which allows movement of said central spherical ball mount around said interconnecting fastener.

4. The support system of claim 3, wherein said conical angle is not to exceed 10 degrees.

5. The support system of claim 1, wherein said base member is welded to the outer wall of the aft end of said transition duct.

6. The support system of claim 1, wherein said central bracket is constructed of multiple pieces.

* * * * *